Oct. 29, 1940.　　　S. T. MORELAND　　　2,219,576
METHOD OF MOLDING HOLLOW SHAPES
Filed Feb. 16, 1938　　　2 Sheets-Sheet 1
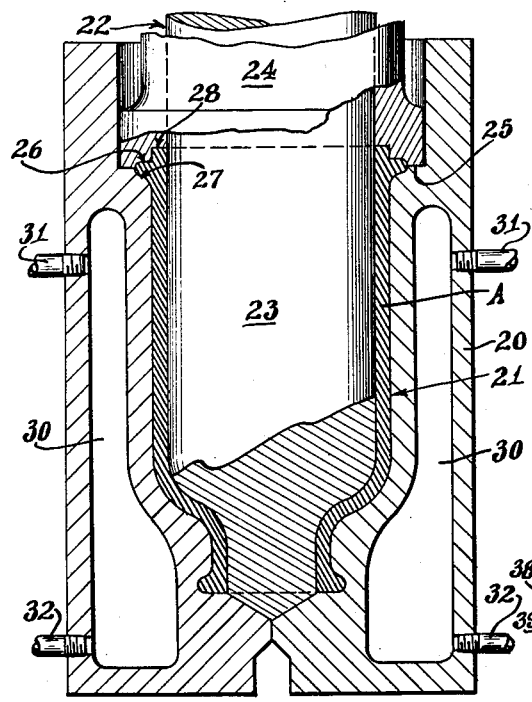
FIG-1-
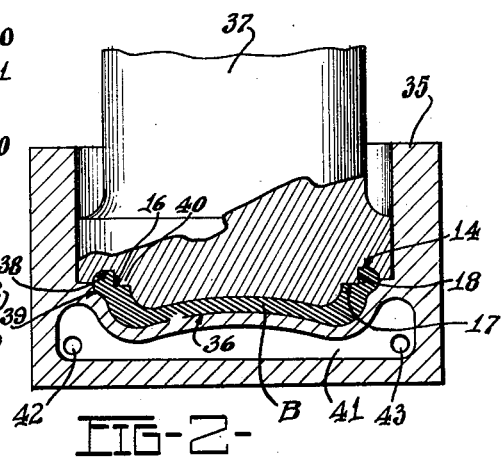
FIG-2-
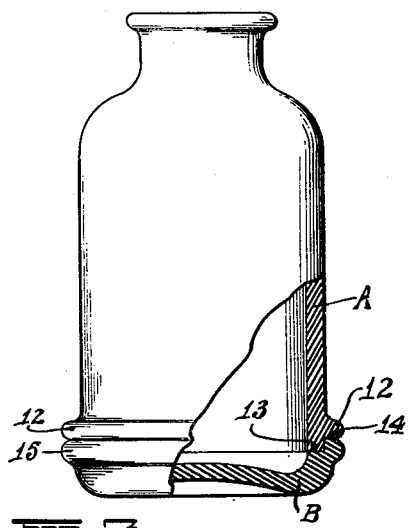
FIG-3-
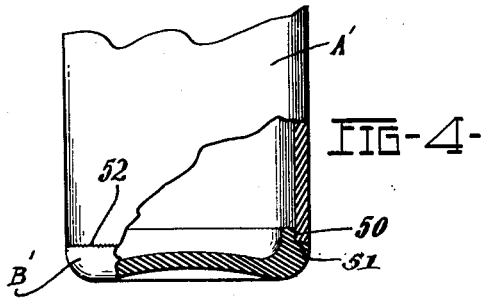
FIG-4-
Stephen T. Moreland.
INVENTOR.
BY Rule & Hoge
ATTORNEYS.

Oct. 29, 1940.    S. T. MORELAND    2,219,576
METHOD OF MOLDING HOLLOW SHAPES
Filed Feb. 16, 1938    2 Sheets-Sheet 2
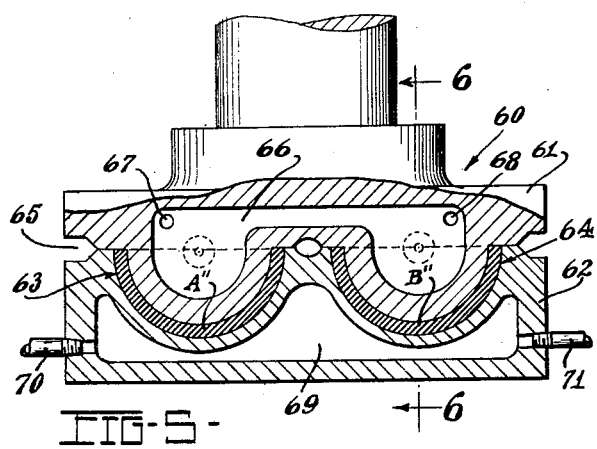
FIG-5-
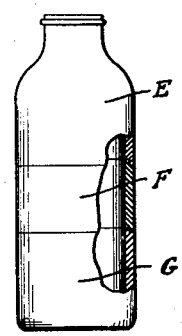
FIG-11-    FIG-12-
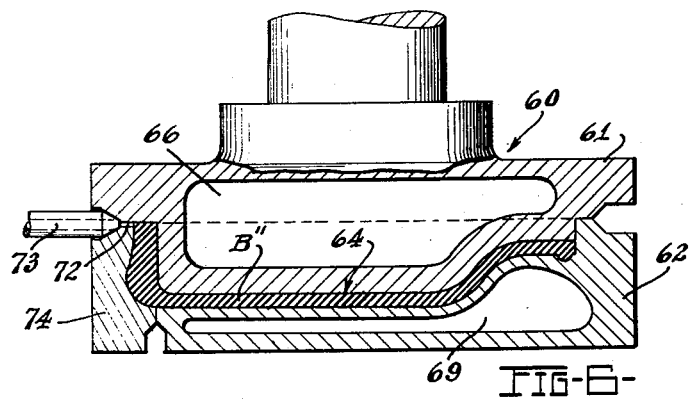
FIG-6-
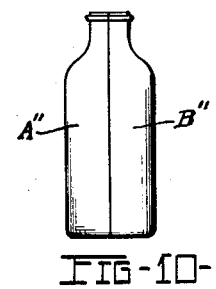
FIG-10-
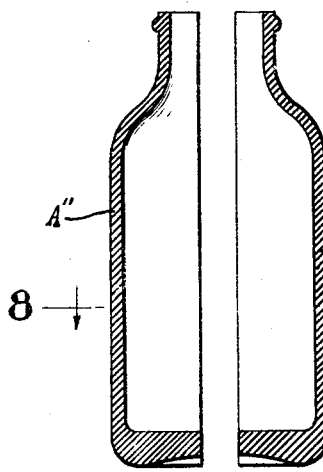
FIG-7-
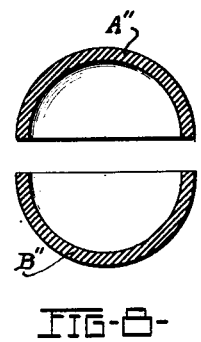
FIG-8-
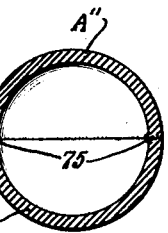
FIG-9-
INVENTOR.
Stephen T. Moreland.
BY Rule & Hoge
ATTORNEYS.

Patented Oct. 29, 1940

2,219,576

UNITED STATES PATENT OFFICE 2,219,576

METHOD OF MOLDING HOLLOW SHAPES

Stephen T. Moreland, Toledo, Ohio, assignor to Owens-Illinois Glass Company, a corporation of Ohio Application February 16, 1938, Serial No. 190,706

1 Claim. (Cl. 18—59)

The present invention relates to a method of forming hollow shapes such as bottles, jars and the like from plastic materials.

The invention embraces a method which, with slight modification thereof, is applicable either to the molding of thermoplastic or heat-nonconvertible materials which are rigid at normal temperatures but which are repeatedly capable of deformation under the influence of heat and pressure, or to thermosetting or heat-convertible materials which initially possess the properties of a thermoplastic but which undergo chemical change in the molding operation so that they are no longer thermoplastic but are permanently infusible.

The principal object of the invention is to provide a method of and an apparatus, by means of which the method may be carried out, for molding plastic materials to form a hollow shape in which the plastic material is compressed and heated or is otherwise formed into two or more counterpart sections of the shape to be molded, and in which the meeting edges of the counterpart sections alternatively are softened by the application thereto of a suitable softening agent and are brought together and allowed to harden or set thus forming the completed article, or are joined together by a suitable adhesive, cement or binding agent.

Another object of the invention, in a modified form thereof, is to provide a method of molding plastic materials to form a hollow shape in which the plastic material is formed by an injection molding process into two or more counterpart sections of the shape to be molded, and in which the preformed sections are assembled in proper juxtaposition by the application thereto of a suitable softening agent or adhesive.

In the accompanying drawings the invention is disclosed in connection with the molding of both thermoplastic heat-nonconvertible and thermosetting heat-convertible materials.

In the drawings:

Fig. 1 is a vertical sectional view taken through a mold showing a forming plunger in operative forming relation thereto in the formation of one section of a bottle;

Fig. 2 is a sectional view similar to Fig. 1 showing a mold and forming plunger in operative forming relationship in the formation of another section of the bottle;

Fig. 3 is a side elevational view, partly in section, of one form of bottle manufactured in accordance with the principles of the invention;

Fig. 4 is a fragmentary side elevational view, partly in section, of another form of bottle;

Fig. 5 is an end elevational view, partly in vertical section, of an injection mold employed in connection with the invention;

Fig. 6 is a sectional view taken substantially along the line 6—6 of Fig. 5;

Fig. 7 is a vertical sectional view taken through a pair of juxtapositioned bottle sections about to be assembled;

Fig. 8 is a sectional view taken substantially along the line 8—8 of Fig. 7;

Fig. 9 is a sectional view similar to Fig. 8 showing the sections of the bottle assembled;

Fig. 10 is a side elevational view of the completed bottle shown in Fig. 9;

Fig. 11 is a side elevational view, partly in section and similar to Fig. 10, showing another form of completed bottle; and Fig. 12 is a side elevational view, similar to Fig. 11, showing still another form of the completed bottle.

In Figs. 1 and 2 are disclosed a method of and an apparatus for molding powdered materials into compressed masses which are of the shape of upper and lower complementary sections of the finished article, which for example in the present instance is in the form of a bottle. While the apparatus shown in Figs. 1 and 2 is capable of use in treating thermosetting heat-convertible materials, it is designed primarily for use in connection with thermoplastic heat-nonconvertible materials and will be so described.

The section of the bottle shown in Figs. 1 and 3, and designated at A, represents the neck portion and substantially all of the body portion of the bottle, while the section shown in Figs. 2 and 3 and designated at B represents the base portion thereof. An annular bead 12 is formed externally on the upper section A a slight distance above the lower rim 13 thereof (Fig. 3). The underneath surface of the bead 12 is substantially flat and, when the sections A and B are assembled, is adapted to abut against the flat upper surface 14 of an annular bead 15 formed on the lower section B. An internal annular recess 16 (Fig. 2) is formed on the section B inwardly of the bead 15 and provides a flat ledge 17 upon which the lower rim 13 is adapted to seat and a narrow cylindrical wall 18 against which the lower outer surface region of the section A bears when the two sections are assembled.

In carrying out the method involved in molding powdered or granular thermoplastic materials into the form of the section A, a two-part separable mold 20 is provided with a mold cavity 21 conforming in shape to the external shape of the neck and body portions of the section A. The sections of the mold 20 are closed upon each other and a quantity of the moldable material in the exact amount required in the formation of the section A is placed in the cavity 21. A pressure head 22 is lowered into operative position in contact with the mold 20 to compress the material in the cavity to the shape of the section A. The pressure head 22 includes a core 23 adapted to extend into the mold cavity 21 to give shape to the neck and body portions of the section A. A combined forming and stripping ring 24 surrounds and is slidably mounted on the core 23 and bears against a shoulder 25 formed on each section of the mold 20 when the ring 24 and core 23 are in full operative forming position in contact with the mold 20.

The ring 24 is provided with an annular recess 26 which cooperates with a recess 27 provided in each section of the mold 20 in forming the annular bead 12 on the section A. The ring 24 is provided with a second annular recess 28 which cooperates with the core 23 in giving shape to the rim 13 of the section A in the mold 20. The ring 24 facilitates removal of the section A from the core 23 after the same is withdrawn from the mold cavity 21 with the formed section adhering thereto.

Since the section A is molded from thermoplastic heat-nonconvertible materials, the molding process is essentially a hot one and accordingly each section of the mold 20 is jacketed or provided with a chamber 30 therein having a fluid inlet 31 and a fluid outlet 32. A suitable heating medium, such as steam, is passed through the chambers 30 from the inlets 31 to the outlets 32 to raise the temperature of the mold 20 to a degree sufficient to render the thermoplastic material soft and pliable and consequently moldable. Movement of the pressure head 22 into contact with the mold 20 compresses or molds and distributes the material therein, giving it the final shape of the section A. As soon as the material has assumed the shape of the section A, a cooling medium is circulated through the chambers 30 from the inlets 31 to the outlets 32 to cool the mold 20 and the material therein and thus render the section A rigid. The mold sections may then be opened and the section A removed.

Referring now to Fig. 2, the apparatus for forming the section B is similar to the apparatus shown in Fig. 1 and includes a unitary open-ended mold 35 having a shallow cavity 36 therein conforming in shape to the shape of the section B. A quantity of the granular or powdered thermoplastic moldable material in the exact amount required in the formation of the section B is placed in the cavity 36. A pressure head 37 is lowered into operative position in contact with the mold 35 to compress the material in the cavity to the shape of the section B. The pressure head 37 is of unitary construction and is provided with an annular recess 38 which cooperates with a shallow recess 39 provided in the mold wall to give shape to the annular bead 15 on the section B. A shoulder 40 formed on the pressure head 37 gives shape to the recess 16 and provides the ledge 17 and cylindrical wall 18 previously referred to.

The mold 35 is jacketed or provided with a chamber 41 therein having a fluid inlet 42 and a fluid outlet 43. The process employed in producing the section B from thermoplastic materials is substantially the same as the process above described in producing the section A and includes the step of rendering the compressed moldable material in the mold cavity 36 plastic by the circulation of a heating medium through the chamber 41 and the step of rendering the formed section B rigid by the circulation of a cooling medium therethrough.

Referring now to Fig. 3, in assembling the sections A and B, the meeting edges of the two sections may be softened by the application thereto of a suitable softening agent and the two sections may subsequently be brought together under slight pressure and the meeting edges thereof allowed to harden. By virtue of the fact that the softened thermoplastic material in the region of the relatively extensive surface areas 17, 18 and 14 of the section A and the complementary surface areas of the section B runs together as in the case of a "weld," a homogeneous and inseparable union between the two parts is formed after the softened material has hardened.

The character of the solvent or softening agent employed for joining the two sections A and B together will of course vary with the character of the thermoplastic material from which the sections are formed. For example, if the thermoplastic material employed is of the common cellulose acetate variety, the logical binder employed will be acetone or a similar solvent.

In Fig. 4 a modified form of bottle is shown in which the beads 12 and 15 shown in Fig. 3 have been omitted. The increased contact areas between the meeting edges of the two sections A' and B' are effected by the provision of an external annular recess 50 at the rim of the lower or base section B' into which the inner edge of the lower rim 51 of the upper section A' snugly fits. The sections A' and B' may be joined together in the manner just described in connection with the sections A and B. Alternatively, however, the sections may be joined together by a suitable binder or adhesive such as is indicated at 52 in Fig. 4. The adhesive 52 is applied to the meeting edges of the sections, the meeting edges brought together, and the adhesive is allowed to dry. Any excess adhesive may be removed from the outside surface of the bottle before the same has hardened, thus presenting a bottle with a smooth exterior. The character of the adhesive will vary with the character of the thermoplastic composition employed in the formation of the sections A' and B'.

Under certain conditions it may be desirable to join the meeting edges of the sections A and B, or the sections A' and B', by softening these edges with a softening agent and by additionally employing an adhesive. It is well within the purview of the invention to use either of these two methods, or both, in combination as expediency dictates.

In Figs. 5 and 6 there is disclosed an injection molding apparatus for constructing complementary longitudinal half-sections A'' and B'' of a bottle. The injection method of molding the sections A'' and B'' is applicable to the construction of such sections both in the case of thermoplastic heat-nonconvertible and of thermosetting heat-convertible materials. For the purpose of description, since one method of molding thermoplastic materials has already been described, the injection apparatus will be described only in connection with thermosetting materials.

The mold 60 comprises upper and lower dies 61 and 62 respectively, which provide therebetween a pair of adjacent mold cavities 63 and 64 conforming in shape to the shape of the longitudinal half-sections A" and B". The meeting surfaces of the dies 61 and 62 are relieved as at 65 leaving a land around the mold cavities 63 and 64 in accordance with customary mold practice. The upper die 61 is jacketed or provided with a chamber 66 having a fluid inlet 67 and a fluid outlet 68 for circulation of a heating medium through the die. The lower die 62 is similarly jacketed with a chamber 69 having a fluid inlet 70 and a fluid outlet 71. The dies are brought to the conversion temperature or to a temperature slightly thereabove and the thermosetting material, after being rendered plastic in an injection cylinder (not shown), is forced through a port 72 from an injection nozzle 73. The material is cured or converted in the mold cavities 63 and 64. The lower die 62 has associated therewith a removable section 74 which, when removed, permits the formed sections of the bottle to be lifted from the cavities 63 and 64.

The sections A" and B" are assembled in the manner previously described in connection with the assembly of sections formed from thermoplastic materials, i. e., by softening the meeting edges thereof with a suitable softening agent and bringing the softened edges together under slight pressure or, alternatively, by employing a suitable adhesive. In Figs. 7 and 8 the sections A" and B" are shown as being juxtapositioned prior to assembly of the same. In Fig. 9 the sections are shown as being assembled by means of an adhesive 75, the adhesive being removed from the exterior surface of the bottle and the bottle presenting a smooth exterior. As is the case in connection with thermoplastic materials, the character of the solvent or adhesive employed varies with the character of the thermosetting material. For example, where phenol-formaldehyde or urea-formaldehyde resinous materials are employed, the glyptol resins, furfural resins or liquid rosin may be employed as the softening agent.

In Figs. 11 and 12 still further modified forms of bottles are shown. The bottle of Fig. 11 is formed of upper and lower sections C and D which are joined together along a medial transverse plane. The bottle of Fig. 12 is formed of three sections E, F and G. In each instance the meeting edges of the sections are connected together by a lap joint which is employed in connection with the use either of a suitable solvent or a suitable adhesive, or both. It is to be understood that the molding equipment for forming the sections C, D, E, F and G will be varied in accordance with proper molding procedure as the case requires.

The present invention is well adapted for use in the manufacture of multi-color articles. For example, the sections A and B, or A" and B" or the sections C and D, or E, F and G may be formed from differently colored moldable materials or from materials that have been previously dyed and which contrast either as to color or as to shade. Where softening agents are employed in joining the sections together, the color contrast obviously is not destroyed. Where adhesives are employed in joining the sections, a neutral or transparent adhesive may be utilized. To further enhance the attractiveness of the articles, metal inlays or overlays may be inserted in the various mold cavities in accordance with usual procedure in such cases.

Modifications may be resorted to within the spirit and scope of the appended claim.

I claim:

The method of forming a bottle from granular thermosetting materials which comprises separately forming quantities of the material into complementary sections of the bottle by the application of heat and pressure thereto, applying a glyptol resin to the meeting edges of the sections to soften the same, bringing the meeting edges together under pressure while soft, and allowing the same to harden.

STEPHEN T. MORELAND.